(12) United States Patent
Deppe

(10) Patent No.: US 8,063,586 B2
(45) Date of Patent: Nov. 22, 2011

(54) METHOD OF DRIVING A DISCHARGE LAMP, AND DRIVING UNIT

(75) Inventor: Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 636 days.

(21) Appl. No.: 12/280,717

(22) PCT Filed: Feb. 21, 2007

(86) PCT No.: PCT/IB2007/050554
§ 371 (c)(1),
(2), (4) Date: Aug. 26, 2008

(87) PCT Pub. No.: WO2007/099477
PCT Pub. Date: Sep. 7, 2007

(65) Prior Publication Data
US 2009/0167211 A1  Jul. 2, 2009

(30) Foreign Application Priority Data
Mar. 3, 2006 (EP) .................. 06110632

(51) Int. Cl.
*G05F 1/00* (2006.01)
(52) U.S. Cl. ............ 315/307; 315/247; 315/224

(58) Field of Classification Search .......... 315/246, 315/247, 224, 225, 209, 291, 307–311; 353/85–87
See application file for complete search history.

(56) References Cited

U.S. PATENT DOCUMENTS

| | | | |
|---|---|---|---|
| 6,724,147 B2 | 4/2004 | Moench et al. | |
| 2004/0251852 A1 | 12/2004 | Kambara et al. | |
| 2005/0023995 A1 | 2/2005 | Ohnishi et al. | |
| 2006/0152871 A1* | 7/2006 | Claus et al. ............ | 361/71 |
| 2007/0170873 A1* | 7/2007 | Mishima .............. | 315/291 |

FOREIGN PATENT DOCUMENTS

| | | |
|---|---|---|
| EP | I729549 A1 | 12/2006 |
| GB | 2375444 A | 11/2002 |
| WO | 9511572 A1 | 4/1995 |
| WO | 2004100620 A1 | 11/2004 |
| WO | 2005094137 A1 | 10/2005 |
| WO | 2005120138 A1 | 12/2005 |
| WO | 2006072852 A1 | 7/2006 |
| WO | 2006072861 A1 | 7/2006 |
| WO | 2006136993 A2 | 12/2006 |

* cited by examiner

*Primary Examiner* — Shawki S Ismail
*Assistant Examiner* — Jany Tran

(57) ABSTRACT

Disclosed is a method of driving a discharge lamp, wherein a value of pressure in the lamp is determined during operation of the lamp at a dimmed power level, a correction factor is determined based on the dimmed power level pressure value, a required power value for a requested light output level is calculated using the correction factor, and the lamp is driven according to the required power value.

12 Claims, 7 Drawing Sheets

State of the Art

METHOD OF DRIVING A DISCHARGE LAMP, AND DRIVING UNIT

This invention relates to a method of driving a discharge lamp. Furthermore, the invention relates to an appropriate driving unit for driving a discharge lamp in a projector system, to a projector system comprising such a driving unit, and to a method of driving a projector system.

Gas discharge lamps, particularly high-pressure gas discharge lamps, comprise an envelope or chamber which consists of material such as quartz glass, capable of withstanding high temperatures. Electrodes made of tungsten protrude into this chamber from opposing sides. The chamber contains a filling consisting of one or more rare gases, and, in the case of a mercury vapour discharge lamp, mainly of mercury. By applying an initial high voltage across the electrodes, a light arc is generated between the tips of the electrodes, which light arc can subsequently be maintained at a lower voltage during operation of the lamp. Owing to their optical properties, high-pressure gas discharge lamps are used for applications such as image rendering in projector systems, where images are rendered on a relatively large backdrop for comfortable viewing, for example a home cinema system using a "beamer". For such applications, a light source as close as possible to a point light source is required, with as great a luminous intensity as possible, and with a spectral composition closely resembling natural light. These properties can be optimally achieved with high-pressure gas discharge lamps or "HID lamps" (High Intensity Discharge lamps) and, in particular, with "UHP lamps" (Ultra High Performance lamps or Ultra High Pressure lamps).

When a high-pressure mercury vapour discharge lamp is being driven at a nominal power level, essentially delivering its rated light output, it is operating above a saturation threshold, above which the mercury in the lamp is present in vapour form. The saturation threshold of a certain type of lamp is governed by many factors such as pressure in the lamp, composition of the fill gas, physical properties of the lamp, and the conditions in which the lamp is operated. To reduce the light output of the lamp, i.e. to dim the lamp, the power at which the lamp is driven is reduced, for example by reducing the voltage and/or current supply of the lamp. In state-of-the-art projector systems using such lamps, the range in which the lamp can be dimmed is limited by the fact that, below the saturation threshold, the mercury vapour in the chamber of the lamp condenses, causing the pressure in the lamp to sink. Furthermore, the composition of the fill gas changes, for example by bromine being bound by mercury, interrupting the regenerative cycle—in which tungsten is transported from the fill gas back to the electrodes from which it has evaporated—and drastically shortening the lifetime of the lamp.

However, it has been found that a discharge lamp can be driven to operate in a dim-phase, i.e. at a level below the saturation threshold, provided that the lamp is driven for a sufficient duration at a level above the saturation threshold before reducing the power to the lamp and driving it in the dim-phase, that the duration of the dim-phase does not exceed a certain time limit, and that the lamp is then driven for a certain minimum length of time above the saturation threshold before re-entering a dim-phase. If these conditions are met, the lamp can indeed be driven at a level below its saturation threshold.

Nevertheless, a further undesirable phenomenon of dimming a lamp in a state-of-the-art projector system is that, when such a lamp is dimmed, for example when a bright scene in a film sequence is followed by a dark scene, the light output first drops to the requested dimmed level, but then drops even further, to a level considerably below the requested light output level. This unwanted drop in light output below the requested light output level is caused by the condensation of the mercury in the lamp leading to a marked drop in pressure in the lamp, which in turn considerably reduces the light output level.

However, the ability to dim a lamp in a projector system is really quite essential, since bright film sequences are often followed by dark film sequences, and these must be rendered faithfully to ensure an enjoyable viewing experience. Compared to cathode ray tubes of television screens, or plasma display panels, projector systems have only a limited means of dealing with contrast and grey-scale resolution, both of which play decisive roles in the quality of dark image rendering. Some manufacturers of projector systems make use of dynamic apertures in an effort to control the light output in dimmed scenes, but these dynamic apertures are susceptible to breakage and are an additional source of noise, while also contributing to the cost factor of such projector systems. In brief, projector systems to date have not been able to deal effectively with the problem of poor image quality in dark scenes.

Therefore, an object of the present invention is to provide a method of driving a discharge lamp to maintain a desired light output at a level of power below a saturation threshold, and an appropriate driving unit which can be used, for example, in a projector system to avoid the problem described above.

To this end, the present invention provides a method of driving a discharge lamp, particularly a high-pressure or ultra-high-pressure discharge lamp, which method comprises determining a value of pressure in the lamp during operation of the lamp at a dimmed power level, and determining a correction factor based on the dimmed power level pressure value. Subsequently, a required power value for a requested light output level is calculated using the correction factor, and the lamp is driven according to the required power value.

For projection system purposes, a discharge lamp is dimmed in order to have it deliver a precise target light output. In state-of-the-art lamps, the light output drops below the requested light output level owing to the phenomenon described above, so that ultimately, the light output is considerably lower than the desired or requested light output, resulting in unsatisfactory image rendering. With the method according to the invention, a correction of this undesirable phenomenon in a simple and straightforward manner is now made possible, by determining or estimating the pressure in the lamp during the dim phase and obtaining a correction factor, based on this pressure, to drive the lamp at the appropriate output level to give the exact requested target light output.

An appropriate driving unit for driving a discharge lamp in a projector system comprises a lamp pressure determination unit for determining a value of pressure in the lamp during operation of the lamp at a dimmed power level, a correction factor determination unit for determining a correction factor based on the dimmed power level pressure value, and a power level calculation unit for calculating—using the correction factor—a required power level value at which the lamp is to be driven to provide a requested light output level. Since a typical state of the art driving unit already comprises modules and units for obtaining measurements and performing computations, a driving unit according to the invention can particularly advantageously be obtained by simply providing an existing driving unit with suitable software modules, or, for example, by upgrading its processor chip.

The dependent claims and the subsequent description disclose particularly advantageous embodiments and features of the invention.

Since the light output of a lamp in a state-of-the-art projector system can be observed to drop further when the pressure in the lamp decreases as power is reduced to dim the lamp, the correction factor determined using the method according to the invention is preferably inversely proportional to a derivative of the pressure value determined at the dimmed power level. Such a derivative can be any suitable value derived or obtained from the dimmed pressure value.

The drop in output power has been observed to behave in an exponential manner. Therefore, in a particularly preferred embodiment of the invention, the correction factor K is given by a exponentiated fraction for which fraction the numerator is given by the dimmed power level pressure value, and the denominator is given by a nominal power level pressure value:

$$K = \left(\frac{Pr_{lamp}}{Pr_{ref}}\right)^{-k} \quad (1)$$

where $Pr_{lamp}$ is the pressure measured or estimated in the lamp chamber, and $Pr_{ref}$ is the rated pressure for that lamp. In a particularly preferred embodiment, the exponent has a value greater than or equal to −1.0, and less than or equal to −0.25 (i.e. the exponent value k lies between 1 and 0.25), so that the correction factor K can therefore be expressed by the following inequality:

$$\frac{1}{\left(\frac{Pr_{lamp}}{Pr_{ref}}\right)^{0.25}} \leq K \leq \frac{1}{\left(\frac{Pr_{lamp}}{Pr_{ref}}\right)} \quad (2)$$

For example, for an exponent value k=0.5, the correction factor K can be expressed as $$K = \frac{1}{\sqrt{\frac{Pr_{lamp}}{Pr_{ref}}}} \quad (3)$$

The correction factor can also be determined in a simpler manner, for example by using a set of known values which might be obtained in a calibration process using a lamp of a certain type, and which values might be judged to be sufficiently accurate to estimate the level of light at a certain pressure in any lamp of the same type. Therefore, in a further preferred embodiment of the invention, the correction factor for the determined pressure value is obtained from a table of correction factors. Such a table of factors might be accessible to the driving unit in the form of a simple look-up table, or LUT, whose values can have been obtained experimentally using measurements obtained in product development, or from a suitable approximation to the behaviour of the output power using, for example, a quadratic equation or other formula providing, for example, a best-fit approximation. The values can also be obtained by obtaining measurements and using them in one of the formulae described above.

Because the light output level of a high-pressure gas discharge lamp is directly influenced by the level of pressure in the lamp, even more so when the lamp is being driven below the saturation threshold, it might be expedient to determine or estimate the lamp pressure at short intervals, in order to be able to make any necessary corrections. Therefore, in a particularly preferred embodiment of the invention, the correction factor is determined once every lamp period, for example every period of alternating current if the lamp is driven with alternating current, so that the necessary corrections to the lamp power can be made without delay. For a lamp being driven at 50 Hz, this means that the correction value is determined 50 times a second.

There are several ways of determining the level of pressure in the lamp required for determination of the correction factor. For example, the method proposed in PCT/IB 2005/053390, not yet published, can be used, in which the voltage across the lamp is continually monitored, as is the impedance of the lamp. Given that the impedance of the lamp and the voltage across the lamp are known functions of the pressure in the lamp and the electrode separation, the pressure in the lamp at a certain voltage can relatively easily be determined.

In another approach, the lamp pressure can be estimated on the basis of the average lamp voltage, e.g. by measuring and noting the average lamp voltage in the preceding normal operation, and then checking to see whether the lamp voltage has dropped below a certain value, which value can be determined by multiplying the average voltage in normal operation by a certain factor. Furthermore, the lamp voltage and the lamp current may be monitored and analysed, and a property of a current-voltage characteristic of the lamp may determined to give an indication of the gas pressure in the arc tube. This method is particularly successful in the case of mercury vapour discharge lamps.

Another preferred way of estimating the pressure value in the discharge chamber of the lamp is based on the reasoning that several factors remain essentially unchanged, or constant, over brief time periods, even though these factors may fluctuate over the lifetime of the lamp. In a preferred embodiment of the invention, the pressure in the lamp is determined in such a way, as will be explained in the following.

The voltage applied to a lamp, $V_{lamp}$, can be expressed as:

$$V_{lamp} = V_{fall} + R \cdot I_{lamp} + V_{ref} \cdot \frac{d_{lamp}}{d_{ref}} \cdot \frac{Pr_{lamp}}{Pr_{ref}} \quad (4)$$

where $V_{fall}$ is the constant voltage fall at the electrodes, also known as the 'fall' voltage, R is the (negative) impedance of the lamp at high pressure, $I_{lamp}$ is the current through the lamp, $V_{ref}$ is the voltage of the plasma arc at reference (nominal) conditions, $d_{lamp}$ is the actual electrode separation, $d_{ref}$ is the nominal electrode separation, $Pr_{lamp}$ is the actual pressure in the lamp, and $Pr_{ref}$ is the reference or nominal lamp pressure. The values of R, $V_{ref}$, $d_{ref}$, and $Pr_{ref}$ are values that can preferably be determined during lamp and/or driver design, and these values can be stored, for example, in a memory module in the lamp driver.

Over a brief period of time, the electrode separation also remains essentially unchanged so that, for a 'momentary' voltage measured across the lamp, equation (4) can be simplified to give:

$$V_{lamp} = V_{fall} + R \cdot I_{lamp} + c_m \cdot Pr_{lamp} \quad (5)$$

where $c_m$ is the corresponding momentary constant, expressed in Volts/bar, given by $$c_m = V_{ref} \cdot \frac{d_{lamp}}{d_{ref}} \cdot \frac{1}{Pr_{ref}} \quad (6)$$

The value of $V_{lamp}$ can be measured using a suitable circuit, for example by means of a voltage divider in the lamp driver. The current through the lamp, $I_{lamp}$, can also easily be obtained for example from measurements, or from values supplied by a control unit responsible for controlling the lamp current.

The value for $V_{fall}$ can assumed to be constant during operation of the lamp at a level above the saturation threshold, so that a value of $c_m$ can ultimately be determined by rearranging equation (5) to give $$c_m = \frac{V_{lamp} - V_{fall} - R \cdot I_{lamp}}{Pr_{lamp}} \quad (7a)$$

whereby, the value of pressure in the lamp $Pr_{lamp}$ can be taken to be the reference pressure $Pr_{ref}$ since the lamp is being driven above the saturation threshold when the momentary constant value is being obtained. The factors that govern the momentary constant value $c_m$ can fluctuate slightly over time. Therefore, in a particularly preferred embodiment of the invention, the momentary constant value $c_m$ is updated at intervals. For example, the momentary constant value can be determined once every lamp period, as for the correction factor. However, since the factors governing the fluctuation of this momentary constant value do not vary as quickly as those affecting the correction factor, it can suffice to determine the momentary constant value at greater intervals, for example every fourth lamp period, in phases in which the lamp is driven at power levels above the saturation threshold. To obtain a more exact value for the momentary constant, a previous value of the momentary constant can optionally be stored and filtered with the new value using a type of low-pass filtering as follows:

$$c_m = 0.99 \cdot c_m^{old} + 0.01 \cdot c_m^{new} \quad (7b)$$

where $c_m^{old}$ is the previous, stored, value of momentary constant, and $c_m^{new}$ is the value obtained from equation (7a). The 'old' value of momentary constant can then be replaced by the value obtained from equation (7b) for the next time around.

The momentary constant value $c_m$ is preferably subsequently used during lamp operation at a dimmed power level to obtain the estimated pressure value in the lamp, $Pr_{lamp}$, by rearranging equation (5) again to give:

$$Pr_{lamp} = \frac{V_{lamp} - V_{fall} - R \cdot I_{lamp}}{c_m} \quad (8)$$

Since the pressure in the lamp can vary from one lamp period to the next, the estimated lamp pressure $Pr_{lamp}$ is preferably calculated every lamp period.

As already explained above, this value of estimated pressure in the lamp is then used to obtain the correction factor K, for example according to equation (3), which is then used to adjust the actual power to the lamp to give the requested light output, as given by the following equation:

$$P_{target} = P_{ref} \cdot L_{target} \cdot K \quad (9)$$

where $P_{target}$ is the power which must be supplied to the lamp in order to obtain the requested light output $L_{target}$, expressed here as a fraction of the nominal light output and $P_{ref}$ is the reference or nominal lamp power. For example, if a lamp with nominal light output of 100 W is to be driven for a light output of 20 W, the value of $L_{target}$ will be 0.2.

In a method of driving a projector system, according to the invention, light emanating from a discharge lamp of the projector system is projected onto a display device to render an image, and the lamp is driven to adjust the target output power as described above. The display device can be reflective, for example a device comprising a multitude of groups of miniscule mirrors, where each group corresponds to an image pixel, and light is reflected off the mirrors and onto or away from the lens through which the image is to be projected onto the screen. Another kind of display device is translucent, and a grey-scale image is rendered on such a display device. The light shining through the display devices—one for each of the spectral components of the light—is recombined and projected onto a backdrop to render the image. A number of other techniques are also available for image rendering, however, at present, there are essentially two kinds of colour generating methods for projector systems. In a first time-sequential method, the colour image is generated by sequential representation of full pictures separately in the three primary colours red, blue and green ("field sequential colour"). Optionally, an additional fourth white image or other additional colours can be displayed. This method is used, for example, in most DLP® (Digital Light Processing; DLP is a registered trademark of Texas Instruments®) projectors.

In a second time-sequential method, the colour image is generated by having all primary colours pass over the display, one after the other, in the form of colour beams or colour strips ("scrolling colour"). For example, some LCoS Liquid Crystal on Silicon) displays operate using this method.

The systems comprise a colour separation or colour filtering, and a modulator for the colour components between the light source and the display to generate light in the three primary colours, or spectral components of the light. The colour separator and the modulator may be mutually integrated to a more or less great extent. For example, in some systems, filtering and modulation are performed by a rotating filter wheel, whereas, in other systems, the colour filtering takes place by means of mirrors and the modulation by means of prisms.

It has been observed that, when a lamp of a projector system is dimmed, the red spectral component is more strongly dimmed than the blue and green components, so that, when the red, blue and green spectral components are reunited in the rendered image, the overall colour quality or colour point can be distorted. Depending on the requirements to be fulfilled by the projector system, this distortion can be perceived to be irritating, and might be perceived by the user of such a system.

Therefore, in a particularly preferred embodiment of the invention, individual correction factors for the red, blue and green spectral components of a requested light output level are obtained. These individual correction factors can be calculated independently, or, in a more straightforward approach, they may be based on the single correction factor K described above. For example, knowing that red light is attenuated more than blue and green light, the individual correction factor for the red spectral component can be taken to be equal to or slightly less than the correction factor itself, while the individual correction factors for blue and green spectral components can be slightly greater than the correction factor itself. In this way, the spectral components of the light used to render the image are optimally adjusted, so that the method according to the invention advantageously provides a simple and efficient way of providing images of high colour quality.

The method according to the invention is particularly advantageous for adjusting the spectral components of the light produced by a lamp in a time-sequential projector system, since each of the spectral components can be individually corrected. To this end, in a particularly preferred embodiment, the individual correction factors are applied sequentially, for example, within one lamp period, to individually adjust the spectral components of the light output of the lamp. The light output can thus be optimised for excellent image rendering at the requested or target light level, even if this level necessitates operation of the lamp at a level of power below the saturation threshold.

A suitably equipped driving unit therefore preferably comprises appropriate adjustment modules which can be implemented in hardware and/or software, and which regulate the power applied to the lamp.

As already indicated, a preferred use of the invention is in a projector system, but it may also be used in any other suitable application in which a precise dimming of a discharge lamp is required.

Other objects and features of the present invention will become apparent from the following detailed descriptions considered in conjunction with the accompanying drawings. It is to be understood, however, that the drawings are designed solely for the purposes of illustration and not as a definition of the limits of the invention. In the drawings, like reference denote the same objects throughout.

The dimensions of objects in the figures have been chosen for the sake of clarity and do not necessarily reflect the actual relative dimensions.

Figure 1:
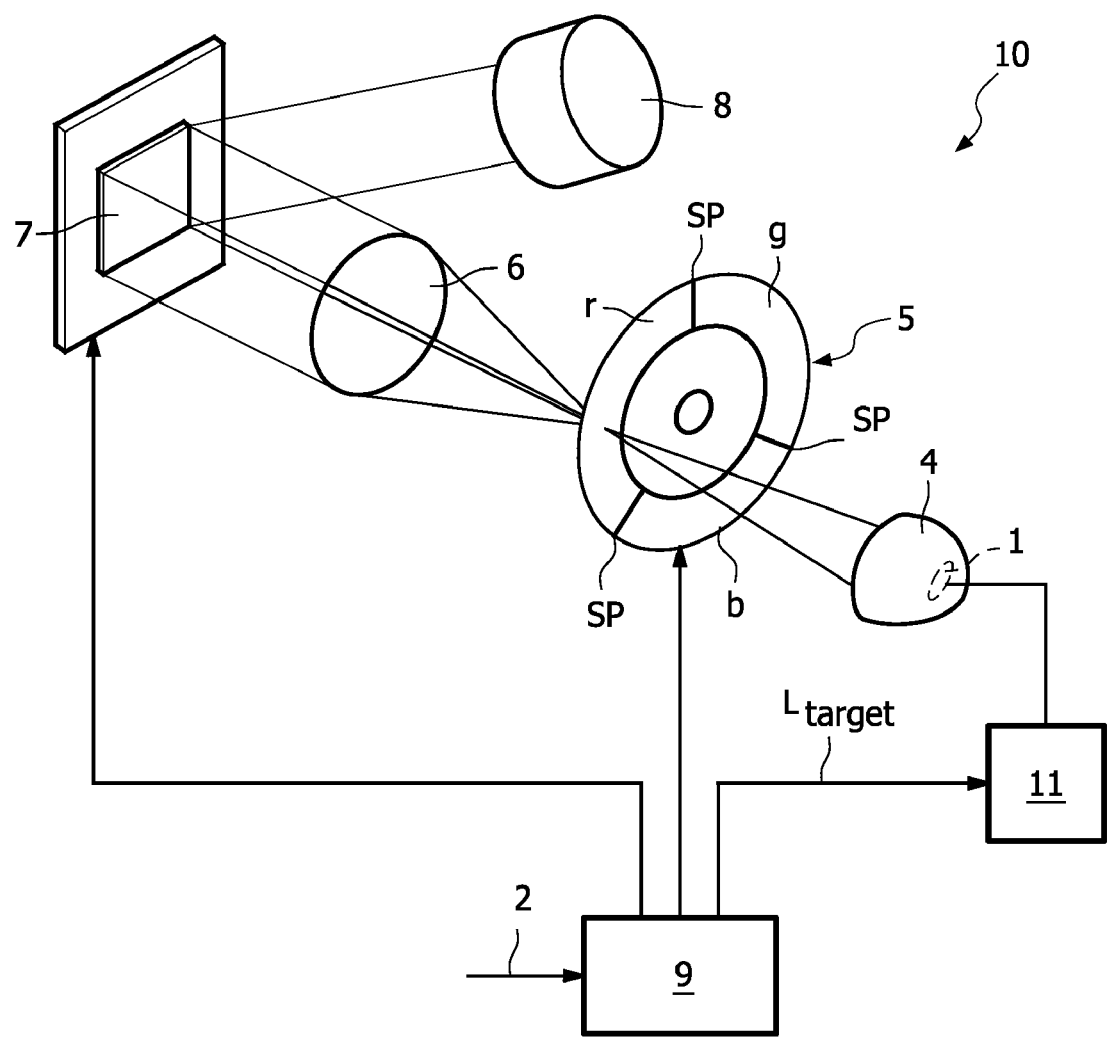
FIG. 1 shows a schematic diagram of a projector system according to a first embodiment of the invention.

FIG. 1 shows a basic construction of a projector system 10 using time-sequential colour rendering, in which the different colours in an image—red, green and blue—are rendered one after the other, a process not perceived by the user owing to the reaction time of the eye.

The light of the lamp 1 is focussed within a reflector 4 onto a colour wheel 5 with colour segments red r, green g, and blue b. For the sake of clarity, only three segments r, g, b are shown. Modern colour wheels generally have six segments with the sequence red, green, blue, red, green, blue. Spokes SP, or transition regions, are found between the segments r, g, b. This colour wheel 5 is driven at a certain pace, so that either a red image, a green image, or a blue image is generated. The red, green, or blue light generated according to the position of the colour wheel 5 is then focussed by a collimating lens 6, so that a display unit 7 is evenly illuminated. Here, the display unit 7 is a chip upon which is arranged a number of miniscule moveable mirrors as individual display elements, each of which is associated with an image pixel. The mirrors are illuminated by the light. Each mirror is tilted according to whether the image pixel on the projection area, i.e. the resulting image, is to be bright or dark, so that the light is reflected through a projector lens 8 to the projection area, or away from the projector lens and into an absorber. The individual mirrors of the mirror array form a grid with which any image can be generated and with which, for example, video images can be rendered. Rendering of the different brightness levels in the image is effected with the aid of a pulse-width modulation method, in which each display element of the display apparatus is controlled such that light impinges on the corresponding pixel area of the projection area for a certain part of the image duration, and does not impinge on the projection area for the remaining time. An example of such a projector system is the DLP®-System of Texas Instruments®.

Naturally, the invention is not limited to just one kind of projector system, but can be used with any other kind of projector system.

The diagram also shows that the lamp 1 is controlled by a lamp driving unit 11, which will be explained later in detail. This lamp driving unit 11 is in turn controlled by a central control unit 9. Here, the central control unit 9 also manages the synchronisation of the colour wheel 5 and the display apparatus 7. A signal 2 such as a video signal 2 can be input to the central control unit 9 as shown in this diagram, and a requested target light output level $L_{target}$ is supplied as a suitable signal to the driving unit 11 in advance, so that the power can be adjusted to provide the requested target light output level.

Figure 2:
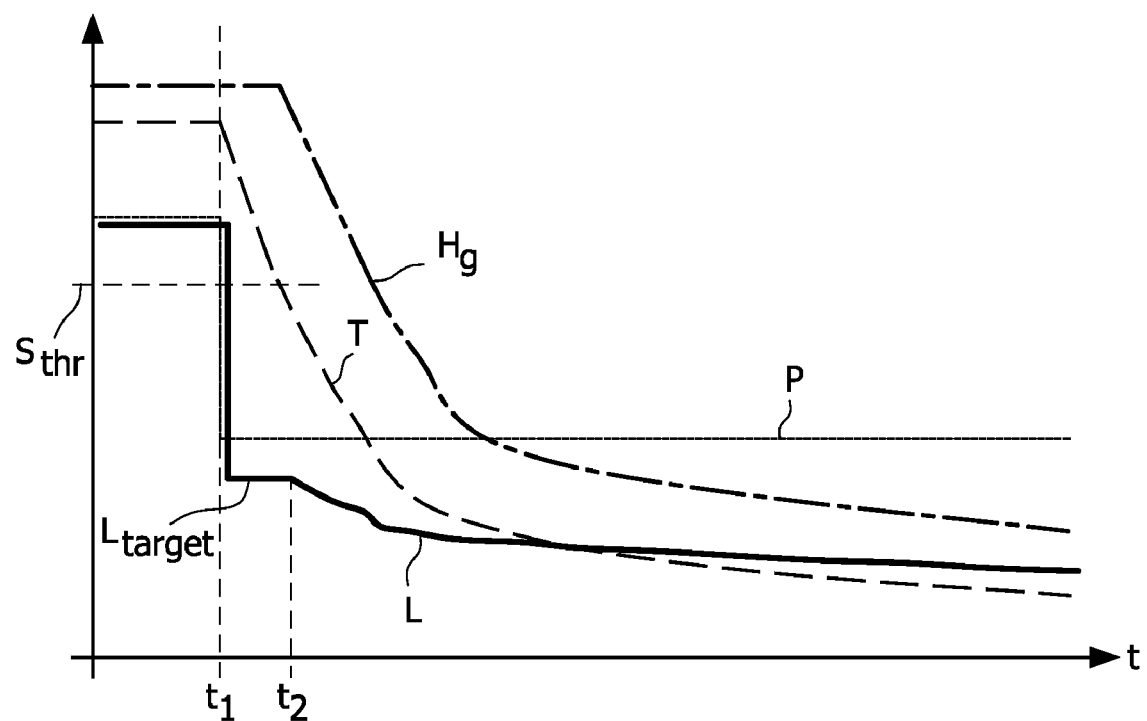
FIG. 2 shows wave shapes for a power, light output, mercury pressure and temperature for a lamp dimmed in a state-of-the-art projector system.

FIG. 2 shows the effect of reducing power to a lamp, used in a state-of-the-art projector system, below a saturation threshold $Sh_{thr}$. Before time $t_1$, the lamp is being operated at, say, rated power, at a level above the saturation threshold level $S_{thr}$. The mercury pressure Hg, temperature T, light output L and power P are all stable. At time $t_1$, power P to the lamp is suddenly reduced to dim the light output L. For a brief duration, up until time $t_2$, the light output L corresponds to the desired dimmed light level $L_{target}$. However, in this time, as the temperature is dropping further, at a certain 'wall' temperature (after a time $t_2$) some of the mercury filling starts to condense and the Hg pressure also starts to drop. This drop in mercury pressure Hg causes the light output L to drop even further than actually desired, so that the image rendered using this lamp will be dimmed even further than was requested.

Figure 3:
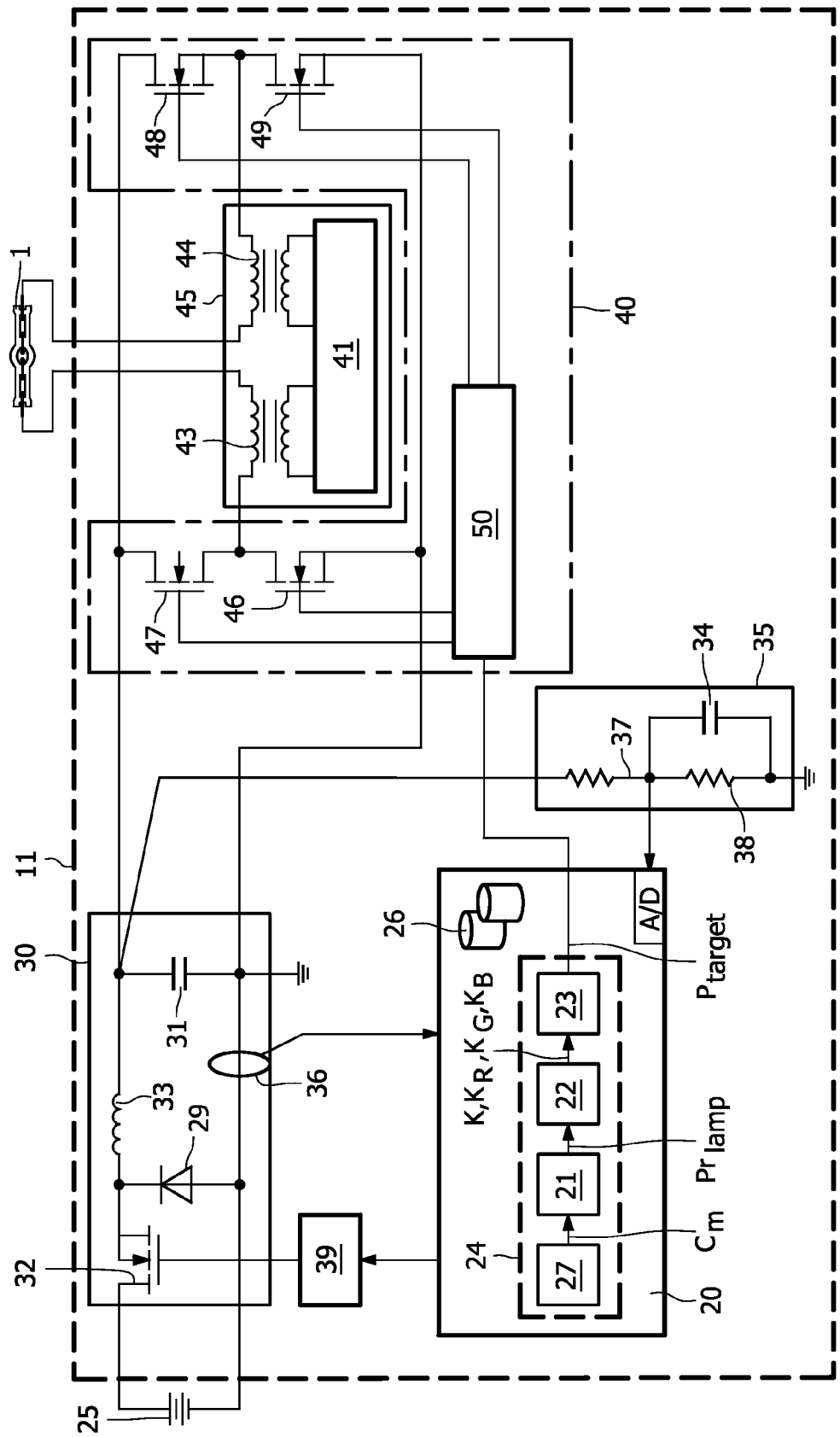
FIG. 3 shows a circuit diagram of a driving unit according to an embodiment of the invention.

FIG. 3 shows a circuit for a possible realisation of a driving unit 11 according to the present invention. The driving unit 11 comprises a direct current converter 30, a commutation stage 40, an ignition arrangement 45, a control circuit 20, a voltage measuring unit 35, and a current measuring unit 36.

The control circuit 20 controls the converter 30, the commutation stage 40, and the ignition arrangement 45, and monitors the voltage behaviour of the driving unit 11 at the gas discharge lamp 1. The commutation stage 40 comprises a driver 50 which controls four switches 46, 47, 48, 49. The ignition arrangement 45 comprises an ignition controller 41 and an ignition transformer which generates, with the aid of two chokes 43, 44, a symmetrical high voltage so that the lamp 1 can ignite.

The converter 30 is fed by an external direct current supply 25 of, for example, 380V. The direct current converter 30 comprises a switch 32, a diode 29, an inductance 33 and a capacitor 31. The control circuit 20 controls the switch 32 via a level converter 39, and thus also controls the current in the lamp 1.

The voltage measuring unit 35 is connected in parallel to the capacitor 31, and is realised in the form of a voltage divider with two resistors 37, 38. A capacitor 34 is connected in parallel to the resistor 38. For voltage measurement, a reduced voltage is diverted at the capacitor 31 via the voltage divider 37, 38, and measured in the control circuit 20 by means of an analog/digital converter. The capacitor 34 serves to reduce high-frequency distortion in the measurement signal.

The current in the lamp 1 is monitored in this example the control circuit 20 by means of the current measuring unit 36, which also operates on the principle of induction, however, a value of current could equally be provided as a 'given' from the central control unit, not shown in the diagram.

The control circuit 20 comprises a lamp pressure determination unit 21 which determines a value of pressure $Pr_{lamp}$ in the lamp, for example according to equation (8), when the lamp is being operated at a dimmed level. To this end, the lamp pressure determination unit 21 records and analyses the values of current and voltage delivered by the voltage measurement circuit 35 and the current measuring circuit 36. Other values that the lamp pressure determination unit 21 might require for determining the pressure $Pr_{lamp}$ in the lamp can be obtained from a memory 26, for example from a look-up-table. The pressure value $Pr_{lamp}$ in the lamp during the dim-phase can be calculated, as described above, using equation (8) and a momentary constant $c_m$. This momentary constant $c_m$ is obtained when the lamp is driven in the "normal"-phase according to equation (7) and computed in a suitable momentary constant computation unit 27.

A correction factor determination unit 22 determines a correction factor K based on the dimmed power level pressure value $Pr_{lamp}$, for example according to inequality (2), or preferably according to equation (3), which in turn is used by a power level calculation unit 23 which then calculates the required power level value $P_{target}$, for example according to equation (9), at which the lamp 1 is to be driven in order to obtain the requested target light output $L_{taget}$.

The lamp pressure determination unit 21, correction factor determination unit 22, power level calculation unit 23 and momentary constant computation unit 27 can all be realised in the form of suitable software modules running on a programmable processor 24, indicated by the dashed line.

For a time-sequential projector system, such as that shown schematically in FIG. 1, individual correction factors can be determined for each of the spectral components of the light output. These individual correction factors $K_R$, $K_G$, $K_B$ can be derived by the correction factor determination unit 22, based on the information it would use to determine an overall correction factor, adjusted by certain values which it can read from, for example, a table of values retrieved from the memory 26.

The value of required output power $P_{target}$ can then be used by the driver 50 to regulate the power applied to the lamp 1.

Figure 4:
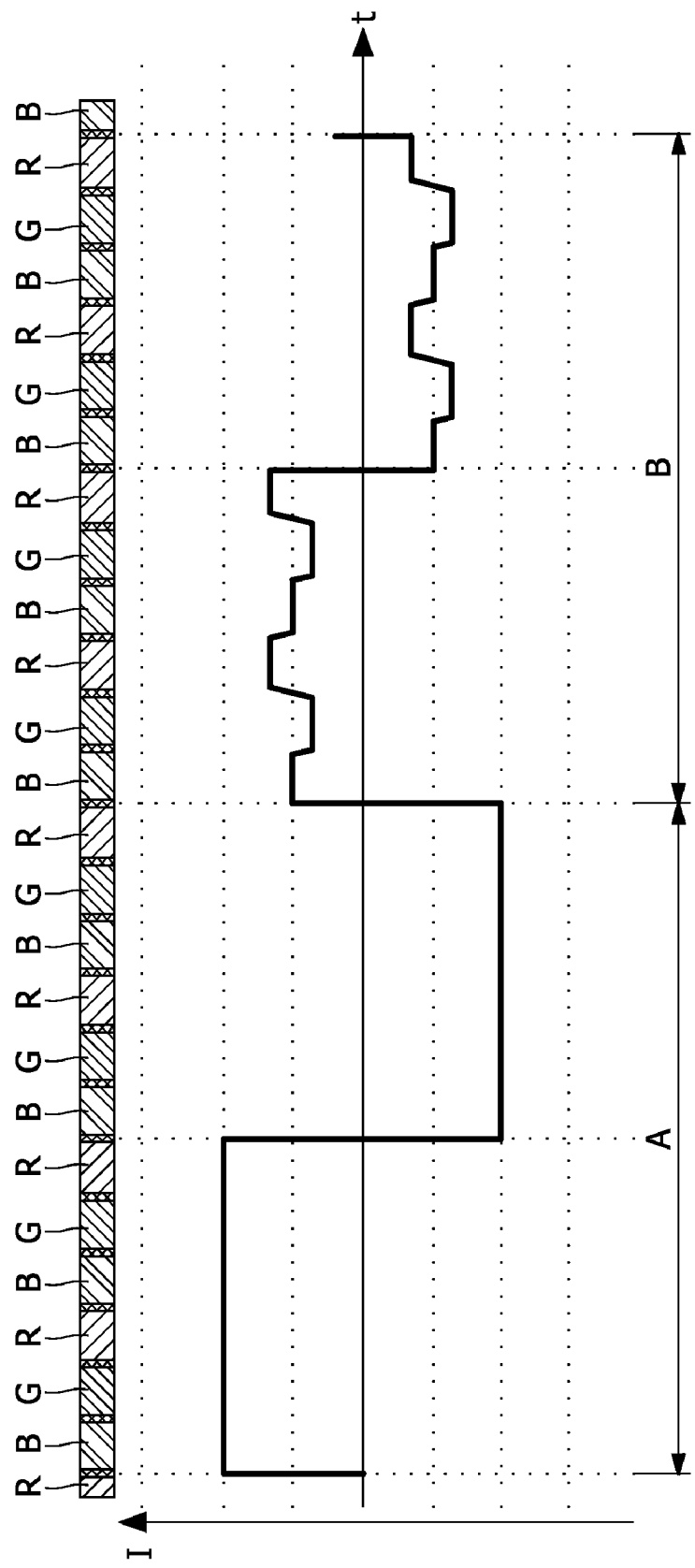
FIG. 4 shows a schematic diagram of spectral components of light output and corresponding power levels determined using the method according to the invention.

FIG. 4 shows a simplified representation of the waveform of current applied to the lamp for a time-sequential projector system. The colour segments R, G, B are shown for a six-segment colour wheel, separated by transition regions. Two full lamp periods A, B are shown. Since the voltage applied to the lamp remains essentially unchanged over a lamp period, the current through the lamp is representative of the power applied to the lamp in that lamp period.

In the first lamp period A, the lamp current is sufficient for operation at nominal or rated power. In the second lamp period B, the power to the lamp has been reduced to a level below the saturation threshold. In this state, the light output, if not corrected, would drop to a level further than that desired. To counteract such an undesirable effect, the power applied to the lamp is adjusted for each spectral component. Since red light is affected most by the drop in pressure, the red spectral component is adjusted by the greatest amount. Blue light would also be attenuated further than actually desired, and is therefore compensated accordingly. Since green light is less affected by the drop in pressure, the green spectral component requires the least correction.

In a technique often used to ensure colour balance in an image rendered in a time-sequential projector system, an increased pulse is produced in the second red segment of each lamp half-period A, B. For the sake of clarity, this has not been shown in the diagram. Evidently, to include this colour balancing technique, the appropriate corrective factor can simply be added to the wave shape shown.

Figure 5:
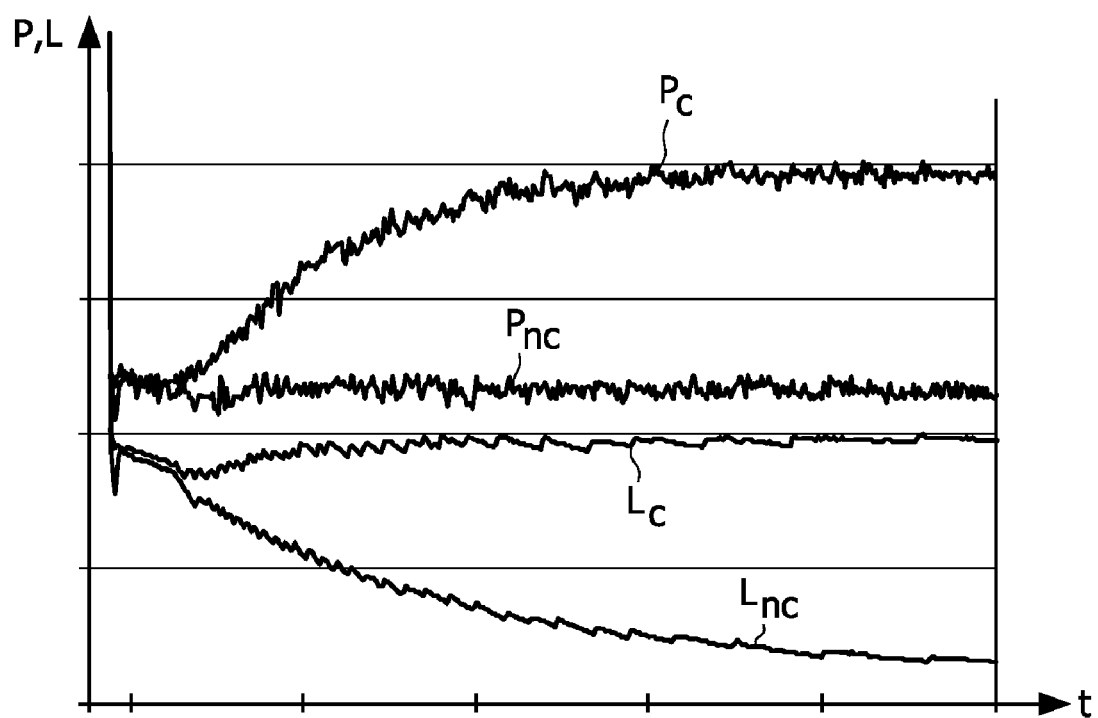
FIG. 5 shows wave shapes for power and light output for a lamp driven according to the invention.

FIG. 5 shows a graph illustrating the effects of the compensated power regulation obtained using the method according to the invention. Wave shapes for non-compensated power $P_{nc}$ and light output $L_{nc}$ are shown, in which the light output drops when the power to the lamp is not compensated. Also, wave shapes for the compensated power $P_c$ and the resulting light output $L_c$ are shown. In state-of-the-art systems, as explained in FIG. 2, the light output $L_{nc}$ drops even further than desired when the power $P_{nc}$ is reduced to a level below the saturation threshold. Using the method according to the invention to compensate or correct the power $P_c$ applied to the lamp, the light output $L_c$ drops to the desired level, and is maintained at that level, so that images are rendered at the requested dimmed level.

Figure 6:
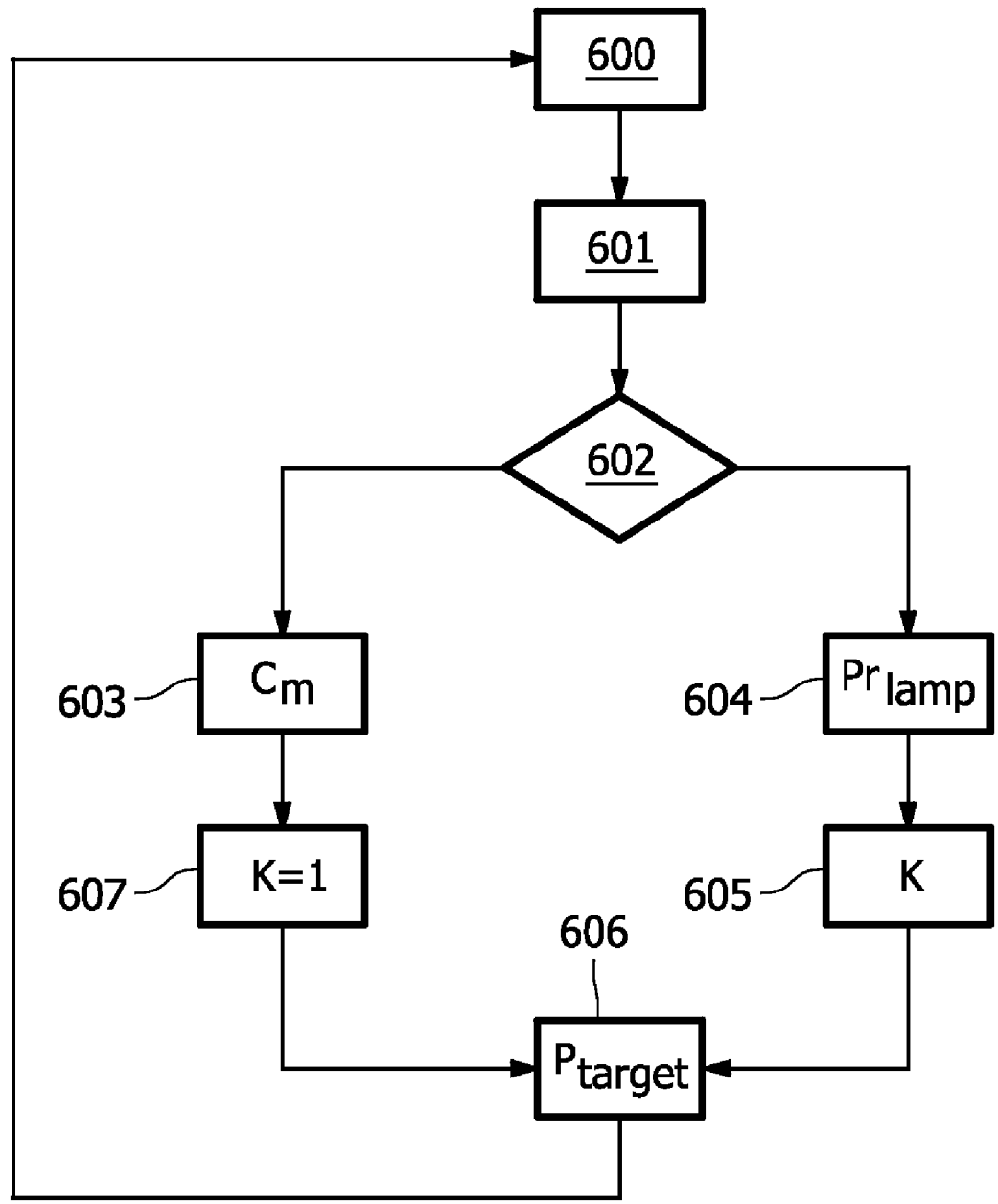
FIG. 6 shows a flowchart of the steps in a process of determining a correction factor and a constant value.

In FIG. 6, a flowchart illustrates the steps involved in a method for obtaining correction factors for the power applied to a lamp in a projector system.

In a measurement step 600, the voltage across and current through the lamp are continually measured. In step 601, the power in the lamp is determined and is used to update a value of average power over a certain time-frame. In a decision step 602, this value of average power is examined to determine whether the lamp is being driven above or below a saturation threshold. If the mean power in this time-frame is greater than the minimum power required to remain above the saturation threshold, a value for the momentary constant $c_m$ is updated according to equations (7a) and (7b) in step 603. Thereafter, in a block 607, the correction factor is set to "1" and the process continues in a block 606 in which the required target power $P_{target}$ for the lamp is determined, and the process then returns to step 600.

If, in block 602, the mean power is observed to have dropped to a value less than the required minimum, the pressure $Pr_{lamp}$ in the lamp is estimated in step 604, using the value of the momentary constant $c_m$. Using the estimated value of pressure, a correction factor K can be determined, for example according to equation (3), in step 605. In step 606, the required value of power $P_{target}$ is computed, according to equation (9), at which level the lamp is to be driven in order to obtain the desired light output level.

Figure 7:
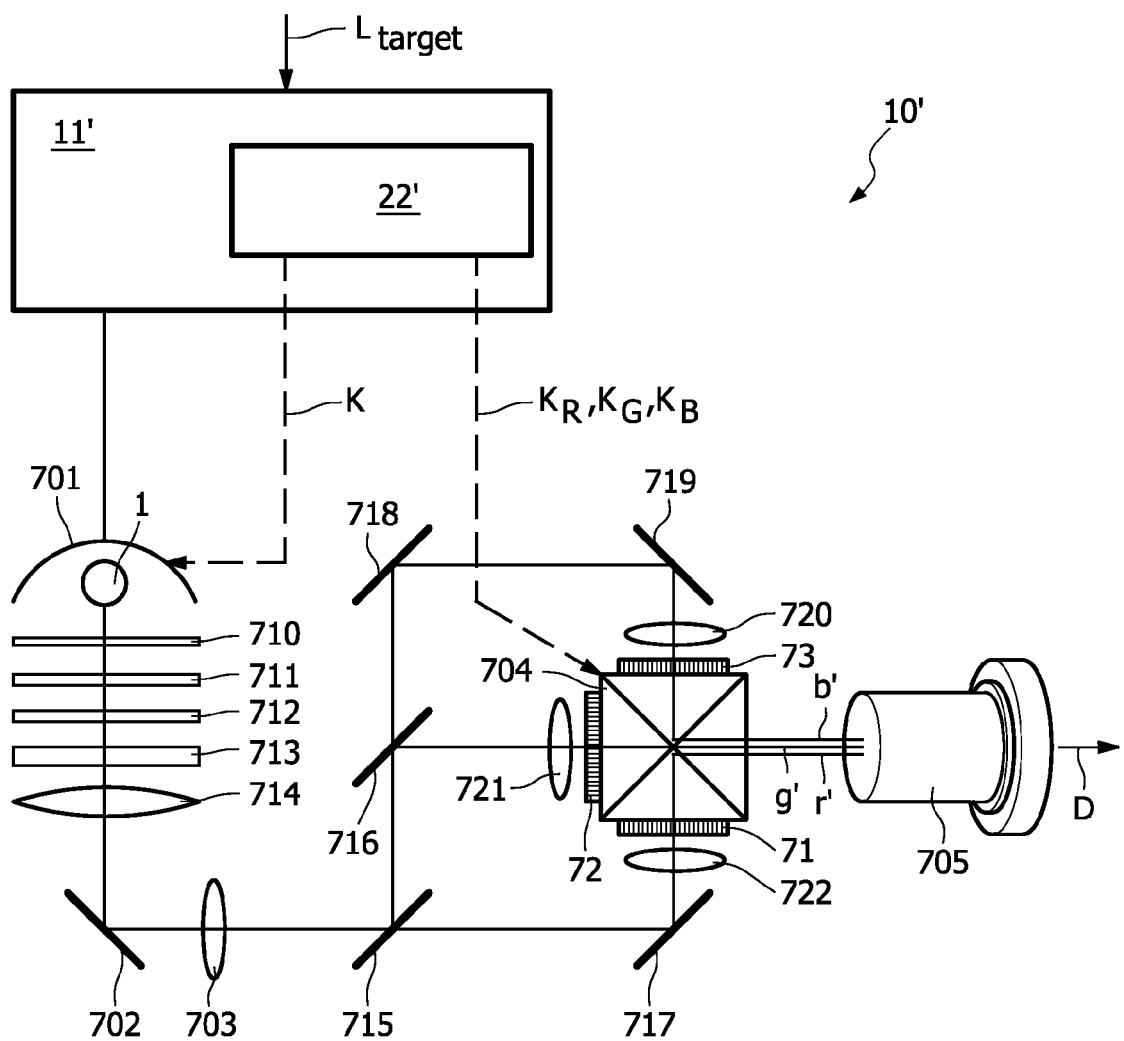
FIG. 7 shows a schematic diagram of a projector system according to a second embodiment of the invention.

The projector system 10' shown in FIG. 7 comprises a light source in the form of a mercury vapour discharge lamp 1, arranged in a reflector 701. Instead of just one lamp 1 and one reflector 701, the projector system can comprise several lamps/reflectors. The details of operation of such a projector system will not be explained in full, since a person skilled in the art is familiar with the functionality of the individual components. These elements need therefore not be dealt with in more detail at this point.

Basically, a cone of light is directed, via the reflector 701, through a an ultraviolet filter 710, followed by two integrators 711, 712, a polarisation conversion system 713, and a collimator lens 714, after which the light is directed to an infra-red filter 702 before continuing through a lens 703.

The beam of light thus prepared then enters a beam splitting system comprising several dichroic colour filters 715, 716 and mirrors 718, which split the beam of light into several spectral components which are further directed through various mirrors 717, 719 and lenses 720, 721, 722 before ultimately arriving at their respective display devices 71, 72, 73—in this case LCD displays 71, 72, 73. Each of these displays 71, 72, 73 serves to generate a picture in a certain colour red r', green g', or blue b'.

By appropriate design of the prism 704, the red, green and blue images are combined to give a colour image, which is beamed by means of a projection lens 705 in the direction of projection D.

Control of the lamp is achieved here with a driving unit 11'. A target light output $L_{target}$ requested or required for rendering an image, for example an image in a video sequence, is input to the driving unit 11'. The internal circuitry of this driving unit 11' used to obtain a driving voltage and current for the lamp 1 may differ somewhat from the driving unit 11 described in FIG. 3 above, but these differences are of no relevance here. For the sake of clarity, only a correction factor computation unit 22' is shown, in which individual correction factors $K_R$, $K_G$, $K_B$ are computed for adjusting the individual display devices 71, 72, 73 according to the target light output, thereby allowing images to be correctly rendered by the projector system 10' even when the lamp 1 is being driven at a power below a saturation threshold. The manner in which these display devices 71, 72, 73 can be adjusted using the individual correction factors $K_R$, $K_G$, $K_B$ will be known to a person skilled in the art.

In such a projector system, the lamp 1 can be driven using an overall correction factor K, while also correcting the individual displays using individual correction factors $K_R$, $K_G$, $K_B$ to ensure a satisfactory colour quality in each of the spectral components.

Although the present invention has been disclosed in the form of preferred embodiments and variations thereon, it will be understood that numerous additional modifications and variations could be made thereto without departing from the scope of the invention. For the sake of clarity, it is also to be understood that the use of "a" or "an" throughout this application does not exclude a plurality, and "comprising" does not exclude other steps or elements. Also, a "unit" or "module" may comprise a number of blocks or devices, unless explicitly described as a single entity.

The invention claimed is:

1. A method of driving a discharge lamp, the method comprising
   determining a value of pressure ($Pr_{lamp}$) in the lamp during operation of the lamp at a dimmed power level;
   determining a correction factor based on the dimmed power level pressure value;
   calculating a required power value for a target light output level using the correction factor; and
   driving the lamp according to the required power value.

2. A method according to claim 1, wherein the correction factor is inversely proportional to a derivative of the pressure value ($Pr_{lamp}$) determined at the dimmed power level.

3. A method according to claim 1, wherein the correction factor is given by an exponentiated fraction, for which the numerator is given by the dimmed power level pressure value, and the denominator is given by a nominal power value, and for which the exponent has a value greater than or equal to −1.0, and less than or equal to −0.25.

4. A method according to claim 1, wherein the correction factor for the dimmed power level pressure value is obtained from a table of correction factors.

5. A method according to claim 1, wherein the lamp is driven with alternating current and the correction factor is determined once every period of alternating current.

6. A method according to claim 1, wherein, during operation of the lamp at a power level above a saturation threshold, a momentary constant value pertaining to the lamp operation is determined, which momentary constant value is used during lamp operation at a dimmed power level to obtain an estimated pressure value in the lamp.

7. A method according to claim 6, wherein the momentary constant value is updated at intervals.

8. A method of driving a projector system, wherein light emanating from a discharge lamp of the projector system is projected onto a display device to render an image, and wherein the lamp is driven using the method according to claim 1.

9. A method according to claim 8, wherein individual correction factors for spectral components of a requested light output level are calculated, and an individual correction factor is used to adjust the light output of the projector system for the corresponding spectral component.

10. A method according to claim 8, wherein the individual correction factors are applied sequentially to individually adjust the spectral components of the light output of the lamp.

11. A driving unit for driving a discharge lamp, which driving unit comprises
    a lamp pressure determination unit for determining a value of pressure in the lamp during operation of the lamp at a dimmed power level,
    a correction factor determination unit for determining a correction factor based on the dimmed power level pressure value,
    a power level calculation unit for calculating, using the correction factor, a required power level value at which the lamp is to be driven to provide a requested light output level.

12. A projector system comprising a high-pressure discharge lamp and a driving unit according to claim 11.

\* \* \* \* \*